United States Patent
Hien

(10) Patent No.: US 10,194,587 B2
(45) Date of Patent: Feb. 5, 2019

(54) METHOD AND DEVICE FOR MEASURING A CROP MASS FLOW ON A FORAGE HARVESTER

(71) Applicant: MSO Meßtechnik und Ortung GmbH, Bad Münstereifel (DE)

(72) Inventor: Peter Hien, Bad Münstereifel (DE)

(73) Assignee: MSO Meßtechnik und Ortung GmbH, Bad Münstereifel (DE)

(*) Notice: Subject to any disclaimer, the term of this patent is extended or adjusted under 35 U.S.C. 154(b) by 0 days.

(21) Appl. No.: 15/553,070

(22) PCT Filed: Feb. 24, 2015

(86) PCT No.: PCT/DE2015/100074
§ 371 (c)(1),
(2) Date: Aug. 23, 2017

(87) PCT Pub. No.: WO2016/134684
PCT Pub. Date: Sep. 1, 2016

(65) Prior Publication Data
US 2018/0027734 A1   Feb. 1, 2018

(51) Int. Cl.
*A01D 43/08* (2006.01)
*G01F 1/30* (2006.01)

(52) U.S. Cl.
CPC ......... *A01D 43/085* (2013.01); *A01D 43/087* (2013.01); *G01F 1/30* (2013.01)

(58) Field of Classification Search
CPC ............ A01D 41/1271; A01D 41/1277; A01D 41/1274; A01D 43/085; A01D 43/086;
(Continued)

(56) References Cited

U.S. PATENT DOCUMENTS 5,736,652 A    4/1998  Strubbe
5,795,221 A    8/1998  Diekhans
(Continued)

FOREIGN PATENT DOCUMENTS

DE    4041995 A1    7/1992
DE    4105857 A1    8/1992
(Continued)

OTHER PUBLICATIONS

Schmittmann, Osman, Kromer "Durchsatzmessung mit Feldhäcksler", Landtechnik Apr. 2000 p. 286-287.
(Continued)

*Primary Examiner* — Robert E Pezzuto
(74) *Attorney, Agent, or Firm* — Smartpat PLC

(57) ABSTRACT

A forage harvester gathers crop by a crop receiving assembly and delivers the crop via infeed units to aggregates for comminuting and conveyance. The crop is then conveyed to a transport vehicle via a discharge chute provided on a discharge tower. A device for adjusting the tilt angle of the discharge chute is provided for guiding the crop mass flow onto the transport vehicle. A method for measuring a crop mass flow on the forage harvester is based on sensing a force proportional to the crop mass flow, which acts upon the device for adjusting the tilt angle of the discharge chute, and calculating the crop mass flow in a computing unit based on the sensed force.

16 Claims, 2 Drawing Sheets

(58) Field of Classification Search
CPC ...... A01D 43/087; G01F 1/30; G01N 21/274; G01N 21/27; G01N 21/276; G01N 21/85; G01N 21/55
USPC .......... 56/10.2 E, 10.2 G, 10.2 R; 73/861.73, 73/861.74, 866.5; 356/328, 500; 460/1, 460/7, 114, 115
See application file for complete search history.

(56) References Cited

U.S. PATENT DOCUMENTS

| | | | |
|---|---|---|---|
| 6,014,903 | A | 1/2000 | Strubbe et al. |
| 6,401,549 | B1 | 6/2002 | Ohlemeyer |
| 6,421,990 | B1 | 7/2002 | Ohlemeyer et al. |
| 6,874,304 | B2 | 4/2005 | Clauss |
| 7,415,365 | B2 | 8/2008 | Jeppe |
| 8,610,445 | B2 * | 12/2013 | Diekhans ............. A01D 43/085 324/694 |
| 8,915,144 | B2 | 12/2014 | Hien |
| 8,961,283 | B2 * | 2/2015 | Claussen ............... G01N 21/274 460/1 |
| 9,220,197 | B2 * | 12/2015 | Pollklas ................. A01D 45/00 |
| 2006/0046802 | A1 | 3/2006 | Vooren et al. |

FOREIGN PATENT DOCUMENTS

| | | |
|---|---|---|
| DE | 19648126 A1 | 5/1998 |
| DE | 10154874 C2 | 9/2003 |
| EP | 0887008 A1 | 12/1998 |
| EP | 1652421 A1 | 5/2006 |
| EP | 2397027 A2 | 12/2011 |
| SU | 1396992 | 6/1988 |
| WO | 1985000087 A1 | 1/1985 |
| WO | 2003039239 A1 | 5/2003 |

OTHER PUBLICATIONS

Won Suk Lee, Thomas F. Burks, John K. Schueller, ‚Silage Yield Monitoring System, ASAE Paper 021165.

* cited by examiner

METHOD AND DEVICE FOR MEASURING A CROP MASS FLOW ON A FORAGE HARVESTER

TECHNICAL FIELD

The present invention relates to a method and a device for measuring a crop mass flow on a forage harvester.

BACKGROUND

A forage harvester combines the functions of gathering, conveying, comminuting and transferring to transport vehicles harvested material such as corn, grass, cereal crops and plantation wood. The harvester is built on a frame, which is supported by a chassis. The self-propelled forage harvester is driven by a high power motor. The forage harvester is operated from a driver's cabin. The harvested material is gathered by means of a crop receiving device and fed to units for comminuting and conveying via intake units, wherein it is accelerated via an accelerator drum with a high rotational frequency and conveyed at high speed via a discharge tower into a discharge chute. The material flows along the upper inner wall of the discharge chute. A deflection of the material flow takes place according to the parabolic curvature of the upper inner wall of the discharge chute. The harvested material leaves the forage harvester via the discharge chute and a tiltable guide plate, which is articulated at its end, to a transport vehicle.

In order to direct the material flow to the transport vehicle, the discharge chute can be tilted by a (double acting) hydraulic cylinder around an axis of rotation on the discharge tower. At the same time, the discharge chute is rotatable about the vertical axis via a hydraulic motor and a gear wheel. During normal operation of the forage harvester, the discharge chute is raised to a working height and the material flow is thrown onto the trailer of a vehicle traveling alongside.

Measuring the crop mass flow is a prerequisite for the crop measurement, precision farming, mass-related billing for harvesting services, control and regulation of machine parameters such as maintaining a fuel-saving engine operating point as well as throughput-dependent regulation of the driving speed and throughput-proportional addition of additives, e.g., silage auxiliaries or preservatives.

A variety of solutions are described in patent documents and literature for determining the crop mass flow on forage harvesters. Different quantities are recorded by means of different physical principles which are related to the throughput of the crop.

A solution for determining the crop mass flow is based on the detection of throughput-proportional torques of conveying and/or comminuting units, e.g., by hydraulic pressure measurement on the hydraulic drive of infeed units (DE 10154874 A1) or hydraulic pressure measurement on the drive of the intake elements (WO 2003/039239A1).

To measure the crop mass flow, the measurement of the throughput-proportional distance between two pre-press rollers arranged in the conveying path of the crop flow is also combined with a force measurement in the region of the maximum limit position as well as a light barrier for detecting a low throughput (U.S. Pat. No. 6,401,549 B1).

The crop mass flow is also derived from the detection of the force effect upon impact and deflection of the crop flow onto an impact plate arranged in the discharge chute (US 2006/0046802 A1, U.S. Pat. No. 6,014,903, U.S. Pat. No. 5,736,652) or on a guide plate at the end of the discharge chute (Schmittmann, Osman, Kromer "Durchsatzmessung mit Feldhäcksler", Landtechnik April 2000 p. 286-287).

Further work suggests a volumetric flow measurement of the crop, e.g., by measuring the crop flow cross-section in the discharge chute by means of laser scanners and the flow rate by means of Doppler radar (Schmittmann, Osman, Kromer "Durchsatzmessung mit Feldschäckslern", Landtechnik April 2000 p. 286-287).

The mass flow-proportional deflection of conveying units such as press rollers (U.S. Pat. No. 5,795,221) is used for measuring the crop quantity on the forage harvester.

In the case of harvesting grass laid in a swath, the throughput is also derived from the dimensions of the grass swath before the receiving unit during grass cutting.

From the patent literature, further solutions are known for deriving the crop mass flow from vibro-acoustic machine parameters (SU 1396992, U.S. Pat. No. 6,874,304, U.S. Pat. No. 7,415,365).

The determination of the crop mass flow from the deflection of a sheet metal covering of a chopping unit by means of a laser interferometer (EP 1652421 A1) was also proposed.

Furthermore, a solution for the derivation of the crop mass flow is known by means of the air pressure difference between two measuring planes in the discharge chute (DE 4041995 A1) with a measuring plane close to the chopper drum and one at the end of the conically narrowing chute.

Capacitive measuring methods determine the crop mass flow using a measuring capacitor (DE4105857 C2).

The microwave attenuation, phase shifting and the measurement at several frequencies are to be used in DE 19648126 A1 for measuring parameters such as "material throughput, moisture, density, mass, etc.".

Radiometric methods, e.g., attenuation by the flow of transmitted gamma, beta or x-ray radiation, have been proposed in WO 1985/000087 A1 but are not used in current practice.

Another possibility known from the literature is the weighing of the container which receives the crop material on a transport vehicle (ASAE Paper 021165, Won Suk Lee, Thomas F. Burks, John K. Schueller: Silage Yield Monitoring System).

In practice, systems with distance measurement on conveyor elements and the measurement of the material flow velocity are used. The systems require frequent calibration due to variable conditions. The function is restricted at low and high crop mass flows. At low crop mass flows, no or only a small deflection of the conveying elements occurs. At high mass flows, end positions of the conveying elements are reached, which prevent the measurement.

The abovementioned conventional systems presuppose a crop mass flow distributed evenly over the width of the conveying elements, which is often not the case.

The properties of the crop (dimensions of the crushed parts, their density, elasticity and compressibility, dry mass content) influence the achievable measuring accuracy.

The present state of the art for crop material measurement on forage harvesters also requires very frequent calibration by reference-weighing and has deficits at low and high crop mass flows and often requires a plurality of sensors. Furthermore, known systems have low social acceptance for radiometric methods and require complex equipment in vehicle-based weighing systems.

The present state of the art usually has indirect solution approaches for the derivation of the crop mass flow.

SUMMARY

An object of the present invention is to provide an improved method for measuring a crop mass flow on a forage harvester, which ensures a high accuracy of the measurement of the crop mass flow over the entire throughput range with a simple, robust design and using few sensors. A device which implements the method is intended to be easily retrofitted to existing machines and to take account of the particular conditions of mobile use when driving over rough terrain, such as environmental conditions, impacts as well as low- and high-frequency oscillations or vibration, and meet the requirements arising therefrom.

According to the invention, the foregoing object is achieved by the features recited in the independent claim(s). Advantageous refinements are disclosed in the dependent claims.

A method of the type mentioned at the outset is characterized by the determination of the force proportional to the mass of the crop mass flow and which acts on a device for adjusting the tilt angle of a discharge chute. The device for performing this method is characterized by corresponding sensors for measuring this force.

BRIEF DESCRIPTION OF THE DRAWINGS

Further objects, features, advantages and possible application options of the method according to the invention will become apparent from the following description of an exemplary embodiment with reference to the drawings.

The drawings show.

DETAILED DESCRIPTION

Figure 1:
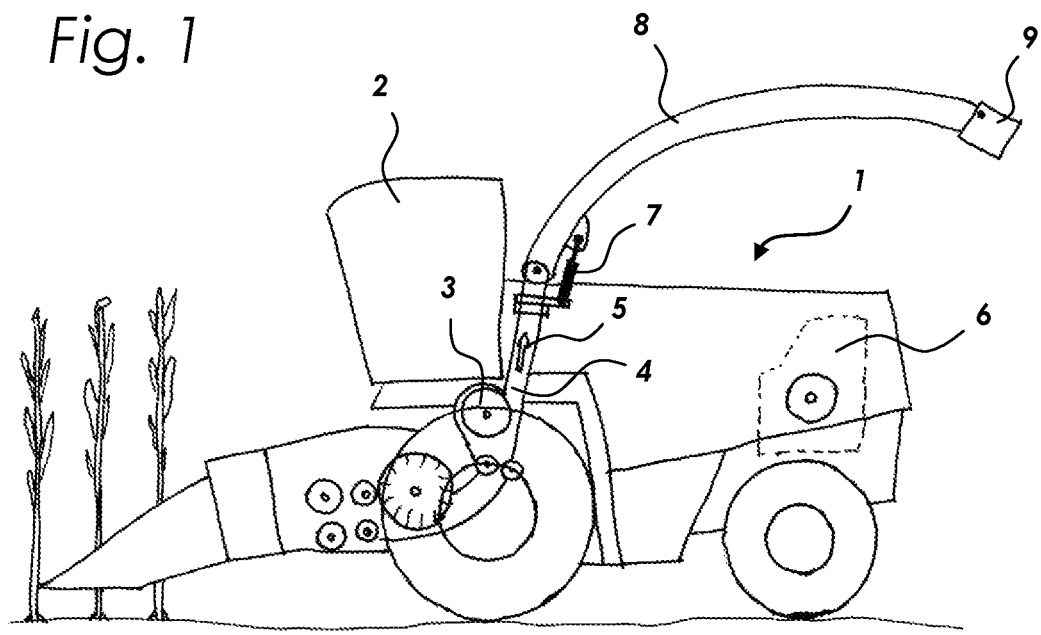
FIG. 1 a forage harvester.
Figure 2:
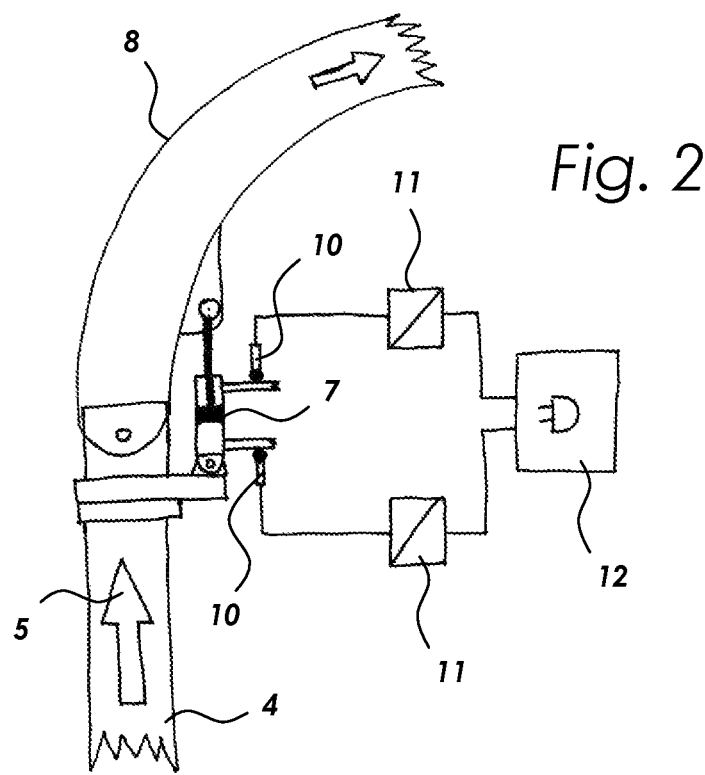
FIG. 2 a section of a discharge chute.

As shown in FIG. 1, a force proportional to the mass of the crop mass flow 5 is determined preferably by constant measurement of the pressures of a hydraulic fluid at the hydraulic cylinder 7 by pressure sensors 10 which detect the pressure of the hydraulic fluid in the port of the respective hydraulic line from the piston bottom side and piston top side (base end and rod end side of the hydraulic cylinder).

The detection of the pressure of the hydraulic fluid on both sides is particularly advantageous since it is simple to measure and can easily be retrofitted to existing machines. Further particular advantages of the two-way pressure measurement are the inherent compensation of shocks and vibration as well as the temperature-dependent variable viscosity of the hydraulic fluid.

The crop mass flow 5 is accelerated by means of the accelerator drum 3, passed through a discharge tower 4 and thrown onto a transport vehicle in the further course of the conveying path through the discharge chute 8. The crop with the mass m is conveyed into the discharge chute 8 at high speed v. The discharge chute 8 is lifted and pivoted into a working position for transferring the crop mass flow 5 to a transport vehicle.

The crop mass flow 5 here flows into the parabolically curved inner wall of the discharge chute 8 and is thereby deflected and guided along this curved surface. The flow pulse $I_{str}$ of the crop mass flow 5 acts as a jet impact on the inner wall of the discharge chute 8. The mechanical impulse I occurring in this case is generally defined as a product of mass m and velocity v corresponding to I=m·v.

The lifting of the discharge chute 8 from the transport into the working position for conveying the crop mass flow 5 to a transport vehicle is preferably effected by a double-acting hydraulic cylinder 7. For measuring the crop mass flow 5, the lifting cylinder 7 is not moved up to the maximum height against an end stop of the hydraulic cylinder 7, but rather to a lower position in which the mass and speed proportional flow pulse $I_{str}$ of the crop mass flow 5 indirectly acts on the respective hydraulic fluid on the piston top side and piston bottom and causes a mass and speed proportional change of the pressure of the hydraulic fluid. In a preferred embodiment, the current pressure of the hydraulic fluid is detected by pressure sensors 10 with a high sampling rate and converted into proportional signal values 11.

Further, a force measurement on the articulation of the hydraulic cylinder 7, e.g., by force measuring bolts (not shown) may be provided.

The signal values of the sensors 10 are filtered and processed in a computer unit 12 in a microprocessor using suitable digital signal processing.

Figure 3:
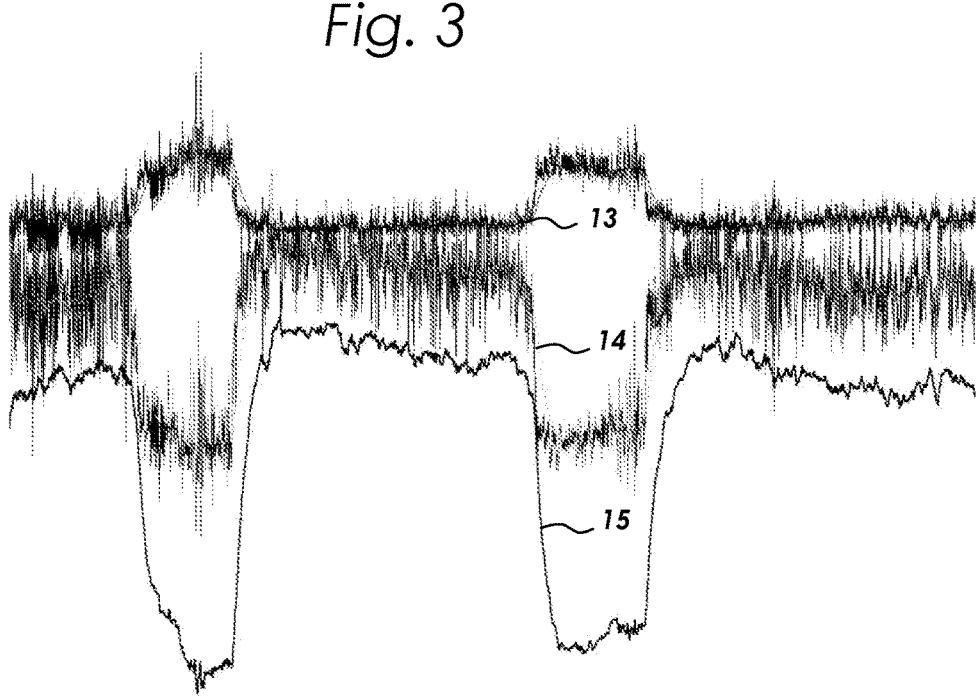
FIG. 3 an exemplary measurement record of the pressure measurement values.

FIG. 3 shows an exemplary, real measurement record of the two pressure measurement values 13, 14 from the hydraulic fluid of the piston top side ("rod side") (FIG. 3 (14)) of the hydraulic cylinder and its piston lower side ("base side") (FIG. 3 (13)) during corn harvest with a forage harvester.

The measurement record, shown in FIG. 3, begins with a present crop mass flow 5 and then shows the course of the measured values at idle speed without a crop mass flow during a turning maneuver (turning into the headland), redeploying of the crop mass flow 5, as well as turning maneuvers. The pressure measurement values 13, 14, which are noisy due to oscillations, impacts, vibrations, as well as the pulsating crop mass flow, are shown. The pressure measurement values 13, 14 are smoothed in further processing via a digital low-pass filter. The actual crop mass flow-proportional result value 15 is preferably calculated by addition after low-pass filtering, offset compensation and weighting of the pressure measurement values 13, 14 based on of the area ratio of the piston upper and lower piston sides of the hydraulic cylinder 7.

The calculation of the crop mass flow 5 is performed based on a calibration factor or a regression function stored in the computer unit 12 or by means of characteristic maps for the instantaneous actual value from the result value 15 as well as integrating over an adjustable time and/or harvested area, then for the yield. The regression curves or characteristic maps are predetermined via weighing the crop as a generally valid basic calibration or in each case as a machine type. A fine calibration during operation can be carried out from time to time by calibrating/adjusting the calculated crop mass flow 5 by means of the actual mass determined via reference-weighing.

The calculated crop mass flow 5 can be located via geo-referencing for mapping and surface-specific allocation for precision farming by means of a locating system such as, for example, a GNSS (global navigation satellite system) and thus can be assigned to a specific area.

In order to lock the discharge chute in a desired position, load-holding valves which block the base end and/or rod end side hydraulic lines attached to the hydraulic cylinder 7 can be used. Since the load holding valve blocks the hydraulic fluid, the sensors for pressure measurement are then to be provided in the hydraulic lines of the piston top side and piston bottom side between the hydraulic cylinder and the load holding valve.

Changes in the force caused by the flow pulse $I_{str}$ of the material flow through the discharge chute are affected by changes of: a) the speed of the material flow; b) the mass of the material flow; c) the acceleration of the discharge chute 8 by oscillation, impact and vibration; d) the friction between the material flow and the inner wall of the discharge chute (shear stress projection); e) the longitudinal and transverse inclination of the forage harvester; and f) the angle of incidence of the discharge chute.

The speed of the crop mass flow 5 can be assumed constant in the simplest embodiment of the invention with good accuracy due to the constant rotational frequency of the accelerator drum 3. In an extended embodiment variant with higher precision, the material flow velocity can be directly measured with known measuring technology devices, e.g., Doppler radar sensor, optical flow sensor, optical correlation sensor, etc. or indirectly by means of a rotational frequency measurement on the accelerator drum 3 with means known per se such as inductive sensors, Hall sensors, rotary coders etc.

The variable mass of the crop mass flow 5 is the target size of the method.

The discharge chute 8, together with the crop, during operation, experiences highly dynamic accelerations mainly in the vertical direction through oscillation, impacts and vibration. These are seen in FIG. 3—showing a part of a measuring record—as a considerable noise signal on the illustrated course of the hydraulic pressure in the return of the piston bottom side and the return of the piston top side. The preferred embodiment of the measurement on the base end and rod end side of the hydraulic cylinder 7 proves to be particularly advantageous since the acceleration-proportional pressure fluctuations on the base end and rod end side (piston top side and piston bottom) can be mutually offset and can thus be canceled.

Furthermore, a reinforcing effect is present when the crop mass flow 5 is varied. At a higher crop mass flow 5, a pressure increase occurs at the piston top side (rod end of the hydraulic cylinder) with simultaneous pressure reduction at the piston bottom side (base end of the hydraulic cylinder). At a lower mass flow, a pressure reduction in turn occurs on the piston top side with a simultaneous pressure rise at the piston bottom side.

The variable friction on the inner wall of the discharge chute 8, e.g., due to caking and variable properties of the crop (for example, chopper size and dry mass content), can impair the measuring accuracy of the mass determination of the crop. The measuring error caused by variable friction of the crop mass flow 5 on the inner wall of the discharge chute 8 can be reduced by a fine calibration by reference-weighing the transport vehicles.

The measurement error caused by the different unladen masses of the discharge chute 8 due to the adhering material can be reduced by means of an empty calibration ("zero tare") carried out from time to time during travel without crop throughput.

The influence of the longitudinal and transverse inclination of the forage harvester, which is variable due to the given terrain shape, is disregarded in the simplest embodiment of the invention. In an extended embodiment with higher accuracy, the inclination of the forage harvester in the longitudinal and transverse directions can be detected by, e.g., inclination sensors. On the basis of inclination angle-dependent characteristic maps, the error caused by the inclination is compensated in a computer unit via software.

The angle of incidence of the discharge chute 8 to the forage harvester 1 or its lifting height, i.e., the working position, is predetermined and held constant in the simplest embodiment of the method. A monitoring of a certain lifting height (working position) which is to be observed is possible with known, simple measuring technology, e.g., by a magnet and magnetic sensor, inductive or Hall-effect sensor. In an extended embodiment, the actual lifting height of the hydraulic cylinder 7 and thus the angle of incidence of the discharge chute 8 can be detected with sensors, such as, for example, a linear encoder. On the basis of a characteristic map dependent on lifting height, the compensation of the error caused by the variable angle of incidence of the discharge chute can be effected in the computer unit via software.

The crop mass flow 5 is passed to a transport vehicle at the end of the discharge chute 8 preferably by means of an adjustable impact plate. Variable forces act on these as a function of the angle of incidence of this impact plate to the discharge chute and influence the accuracy of the measurement. In an extended embodiment, therefore, the angle of incidence of this impact plate is detected by a sensor such as, e.g., a linear encoder, and is offset by means of a correction map to compensate for this measurement error.

The influencing of the measuring accuracy by a variable viscosity of the hydraulic fluid due to a variable temperature is largely compensated by the measurement of the pressure of the hydraulic fluid column in the port of the piston bottom side and piston top side.

The crop mass flow is guided along the parabolic inner profile of the discharge chute and thus causes an integrating impact pulse over the entire length of the inner profile. The design of the measuring device is particularly advantageous since it ensures a smoothed detection of the integrated force proportionally to the crop mass flow.

LIST OF REFERENCE NUMERALS

1 Forage harvester
2 Driver's cabins
3 Accelerator drum
4 Discharge tower
5 Crop mass flow
6 Motor
7 Device for adjusting the tilt angle/hydraulic cylinder
8 Discharge chute
9 Tiltable guide plate
10 Pressure sensors
11 Proportional signal values
12 Computer unit
13 Pressure measurement value at the piston under side
14 Pressure measurement value at the piston top side
15 Result value

The invention claimed is:
1. A method for measuring a crop mass flow stream on a forage harvester, comprising:
gathering crop material by a crop receiving device;
delivering the crop material via infeed units to aggregates for comminuting and conveying;
conveying the crop material to a transport vehicle via a discharge chute provided on a discharge tower;
providing a device for adjusting a tilt angle of the discharge chute for deflecting the crop mass flow onto the transport vehicle;
determining a force proportional to the crop mass flow which acts on the device for adjusting the tilt angle of the discharge chute; and
calculating, in a computer unit, a result value proportional to the crop mass flow in response to the determined force based on at least one of a calibration factor, a regression function, and characteristic maps stored in the computer unit.

2. The method according to claim 1,
wherein the device for adjusting the tilt angle of the discharge chute comprises at least one hydraulic cylinder, and
wherein determining the force proportional to the crop mass flow comprises measuring pressures of a hydraulic fluid at the at least one hydraulic cylinder by pressure sensors.

3. The method according to claim 2, wherein values determined by the pressure sensors are converted into proportional signal values.

4. The method according to claim 2, wherein the result value proportional to the crop mass flow is calculated by addition after low-pass filtering, offset compensation and weighting of the measured pressure values based on an area ratio of a piston upper side and lower side of the hydraulic cylinder.

5. The method according to claim 2,
wherein measuring pressures of the hydraulic fluid takes place on a rod end side and on a base end side of the at least one hydraulic cylinder.

6. The method according to claim 5, wherein the pressure sensors sense the pressure of the hydraulic fluid within hydraulic lines attached to a rod port and a base port of the hydraulic cylinder.

7. The method according to claim 1,
wherein the device for adjusting the tilt angle of the discharge chute comprises at least one hydraulic cylinder, and
wherein force sensors are provided at an articulation of the at least one hydraulic cylinder for determining the force proportional to the crop mass flow.

8. The method according to claim 7, wherein values determined by the force sensors are converted into proportional signal values.

9. The method according to claim 1, wherein a crop mass is calculated by integrating the result value over at least one of an adjustable time and a harvested area.

10. The method according to claim 9, wherein the regression function or characteristic maps comprise predetermined basic calibrations which are specific to a machine type and have been determined by weighing.

11. The method according to claim 1,
wherein at least one of a longitudinal and a transverse inclination of the forage harvester is detected by sensors, and
wherein a software compensation of an error caused by the inclination is based on characteristic maps dependent on the inclination.

12. The method according to claim 1, wherein an angle of incidence of an impact plate provided on the discharge chute is measured and wherein the measured angle of incidence is used by a correction map to compensate a measurement error caused by variable forces due to the angle of incidence of this impact plate to the discharge chute.

13. The method according to claim 2, wherein a measuring inaccuracy caused by variable viscosity of the hydraulic fluid due to variable temperature is largely compensated by the measurement of the pressure of the hydraulic fluid in a rod port and a base port of the hydraulic cylinder.

14. The method according to claim 1, wherein a computed crop mass flow is located via geo-reference by a locating system for mapping and allocation specific to partial areas for precision farming, and is assigned to it in a manner specific to partial areas.

15. A device for performing the method as in claim 1, comprising: sensors for measuring the force proportional to the crop mass flow which acts on the device for adjusting the tilt angle of the discharge chute.

16. The device according to claim 15, wherein the device for adjusting the tilt angle of the discharge chute comprises a hydraulic cylinder and wherein load holding valves are provided within hydraulic lines connected to a rod port and a base port of the hydraulic cylinder for locking the discharge chute in a given position.

* * * * *